United States Patent
Hayashi

(10) Patent No.: US 7,800,328 B2
(45) Date of Patent: Sep. 21, 2010

(54) FAN MOTOR DRIVING CIRCUIT

(75) Inventor: Hiroaki Hayashi, Kyoto (JP)

(73) Assignee: Rohm Co., Ltd. (JP)

( * ) Notice: Subject to any disclaimer, the term of this patent is extended or adjusted under 35 U.S.C. 154(b) by 326 days.

(21) Appl. No.: 12/105,473

(22) Filed: Apr. 18, 2008

(65) Prior Publication Data

US 2008/0272724 A1    Nov. 6, 2008

(30) Foreign Application Priority Data

Apr. 19, 2007   (JP) ............................. 2007-110634

(51) Int. Cl.
*H02P 1/04* (2006.01)

(52) U.S. Cl. .................. 318/430; 318/431; 318/432

(58) Field of Classification Search .......... 318/430, 318/431, 432, 433, 400.22; 388/804, 806, 388/815; 327/534; 363/16
See application file for complete search history.

(56) References Cited

U.S. PATENT DOCUMENTS

2005/0219866 A1* 10/2005 Shimada ................. 363/16

FOREIGN PATENT DOCUMENTS

| JP | 7-95792 A | 4/1995 |
| JP | 2001-45790 A | 2/2001 |

* cited by examiner

*Primary Examiner*—Karen Masih
(74) *Attorney, Agent, or Firm*—Cantor Colburn LLP

(57) ABSTRACT

A fan motor driving circuit controls an energized state of a fan motor by performing on and off control of a switching circuit connected to a coil of the fan motor of a driving object. A variable reference voltage circuit generates a voltage whose voltage level changes with time by charging or discharging a capacitor at the start of starting up the fan motor. A drive signal combining unit generates drive signals on the basis of the voltage when at least starting up, and performs on and off control of the switching circuit by the drive signals. An initialization circuit initializes the capacitor before starting up with a transition from off to on of a power supply voltage to be supplied to the fan motor driving circuit as a turning point.

12 Claims, 3 Drawing Sheets

FAN MOTOR DRIVING CIRCUIT

BACKGROUND OF THE INVENTION

1. Field of the Invention

The present invention relates to a motor driving technique and, more particularly, relates to a control when starting up a motor.

2. Description of the Related Art

In order to rotate a single-phase motor and a multi-phase motor at a desired torque, there is widely used a technique which controls an energization period of a motor coil by a pulse signal such as pulse width modulation signals.

In the case where driving of a stopped motor is started, when a switching voltage having a pulse width corresponding to a target torque is suddenly applied to a motor coil, an electric current is suddenly flown to the motor coil. The current flowing through the coil becomes a value in which the applied voltage is divided by a winding resistance because there is no generating function when starting up the motor, specifically, in the case where the number of rotation thereof is near to 0. A resistance value of the coil is designed to be very low in order to reduce electric power loss; therefore, the coil current exceeds the ratings of a driving circuit and the coil itself; and consequently, there is a case which provides influence on reliability of the circuit.

Furthermore, a counter electromotive voltage across the coil is proportional to a time changing rate of the current flowing through the coil. Therefore, as described above, when the coil current is rapidly increased, a very large counter electromotive voltage is generated, and the rating of the driving circuit is likely to be exceeded.

From such a reason, immediately after the start of starting up the motor, a soft start control which makes the current flowing through the coil increase gradually (for example, see Japanese Patent Application (Laid open) No. H7-95792, and Japanese Patent Application (Laid open) No. 2001-45790). In the soft start control disclosed in the Patent Document 1, a soft start voltage whose voltage value is slowly increased in response to time is generated, the soft start voltage is compared with a periodic voltage of a triangular wave or sawtooth wave pattern, a pulse modulation signal whose duty ratio is slowly increased is generated, an energization time of the coil is slowly increased, and the soft start is performed.

A voltage obtained by charging (discharging) a capacitor is used in generating the soft start voltage. When a power supply voltage is supplied to a fan motor driving circuit, the discharge of the capacitor is started, and a voltage slowly increasing or decreasing with time is generated.

In the case where the power supply voltage to be supplied to the fan motor driving circuit is shut down in a normal procedure, if a charge stored in the capacitor is discharged before the circuit is completely stopped, it is possible to generate the soft start voltage which is gradually increased from an initial voltage when the circuit is started up in the next.

However, when the power supply voltage to the fan motor driving circuit is instantaneously interrupted by an unexpected method different from the normal procedure, the circuit is shut down without discharging the charge stored in the capacitor. Since the charge stored in the capacitor loses its discharging path, the soft start voltage is continued to hold a certain value. In this case, when the fan motor driving circuit is started up in the next, the soft start voltage is started to increase from the value; and therefore, it is not possible to execute the desired soft start.

SUMMARY OF THE INVENTION

The present invention has been made in view of such a problem, and a general purpose of the present invention is to provide a technique capable of effectively starting up in the case where a fan motor driving circuit is stopped in an unexpected procedure.

One embodiment of the present invention relates to a fan motor driving circuit which controls an energized state of a fan motor by performing on and off control of a switching circuit connected to a coil of the fan motor. The fan motor driving circuit includes a variable reference voltage circuit which generates a voltage whose voltage level changes with time by charging or discharging a capacitor at the start of starting up the fan motor; a drive signal combining unit which generates a drive signal on the basis of a voltage output from the variable reference voltage circuit when at least starting up, and performs on and off control of the switching circuit by the drive signal; and an initialization circuit which initializes the capacitor by discharging a charge across the capacitor with a transition from off to on of a power supply voltage to be supplied to the fan motor driving circuit as a turning point.

During driving the fan motor, in the case where the power supply voltage to be supplied to the fan motor driving circuit is instantaneously interrupted, even when the charge is remained in the capacitor, a voltage across the capacitor can be initialized by discharging (charging) the capacitor at the next starting up, and a good starting up can be realized.

The initialization circuit may include an initialization switch arranged between one end of the capacitor and a fixed potential terminal; and a switch control unit which detects the transition from off to on of the power supply voltage, and turns on the initialization switch during a predetermined time after detection. It is preferable that the predetermined time is set to be not lower than a time in which the charge charged in the capacitor is sufficiently dischargeable.

The switch control unit may include: a comparator which compares the power supply voltage with a predetermined threshold voltage, and generates a comparison signal that becomes a first level when the power supply voltage is higher or a second level when the power supply voltage is lower, than the predetermined threshold voltage; and a timer circuit which receives the comparison signal from the comparator, starts time measurement with a transition from the first level to the second level of the comparison signal as a turning point, and generates a control signal that becomes a predetermined level during a predetermined time. The initialization switch may be switched on and off in response to the control signal.

The switch control unit may further detect the transition from on to off of the power supply voltage, and turn on the initialization switch with the detection as a turning point.

When the power supply is interrupted, the power supply voltage is gradually decreased. In this case, while the power supply voltage is continued to hold a movable level of a circuit element, the initialization switch is turned on. By performing this process, even when the power supply voltage is transited from on to off in addition to the case when the power supply voltage is transited from off to on, the capacitor can be initialized; and therefore, sureness of the process is increased.

The fan motor driving circuit of the one embodiment may further include: an oscillator which generates a periodic voltage of a predetermined frequency; and a comparator which compares the voltage output from the variable reference voltage circuit with the periodic voltage, and generates a pulse signal whose duty ratio changes in response to a voltage value of the voltage output from the variable reference voltage circuit. The drive signal combining unit may control an energization time of the switching circuit on the basis of the pulse signal.

The fan motor driving circuit of the one embodiment may further include: a current detection circuit which detects a current flowing through the coil of the fan motor, converts into a voltage, and outputs the same as a detection voltage; and a current limit circuit which controls the drive signal combining unit so that the detection voltage does not exceed an upper limit voltage which sets an upper limit of the current flowing through the coil. In this case, the voltage output from the variable reference voltage circuit may be set to the upper limit voltage.

According to this embodiment, the current flowing through the coil of the fan motor is suppressed to not higher than a current value specified by the voltage output from the variable reference voltage circuit. The current flowing through the coil of the fan motor is also slowly increased by slowly increasing the voltage output from the variable reference voltage circuit in starting up; and therefore, it can be suitably started up.

The current limit circuit may include a comparator which compares the detection voltage with the upper limit voltage, fix a logical value of the drive signal generated by the drive signal combining unit so that a current supply to the fan motor by the switching circuit is stopped when the detection voltage exceeds the upper limit voltage, and then, release the fixation of the logical value at a predetermined timing.

In this case, when the current flowing through the coil reaches a current upper limit value, after that, the current supply to the coil of the fan motor is stopped during a period till the fixation of the logical value is released at the predetermined timing; and therefore, it becomes possible to suppress that the current flowing through the coil exceeds the current upper limit value.

The current limit circuit may further include a release signal generating unit which generates a release signal that is in synchronization with the drive signal generated in the drive signal combining unit and becomes a predetermined level, and releases the fixation of the logical value of the drive signal with the release signal generated by the release signal generating unit becoming the predetermined level as a turning point.

When the fan motor performs switching driving (pulse driving), there is a case that spike-like noise is generated in the current flowing through the coil of the fan motor at a switching timing by the drive signal; and there is a case that the detection voltage exceeds the upper limit voltage by the noise and an overcurrent state is faultily detected. Consequently, influence in which the noise exerts on rotation control of the fan motor can be reduced by releasing the fixation state of the logical value of the drive signal by the release signal synchronized with the drive signal.

The current limit circuit may include a first comparator which compares the detection voltage with a predetermined periodic voltage, a second comparator which compares the upper limit voltage with the periodic voltage, and a compound circuit which generates a limit pulse signal in which output signals of the first comparator and the second comparator are combined by logical operation. The drive signal generating circuit may limit a duty ratio of the drive signal to be output to the switching circuit in response to the duty ratio of the limit pulse signal.

The fan motor driving circuit may be monolithically integrated on one semiconductor substrate. The "monolithically integrated" includes a case where all of constituent elements of the circuit are formed on the semiconductor substrate, or a case where major constituent elements of the circuit are monolithically integrated, and some resistors and capacitors may be provided on the outside of the semiconductor substrate for adjusting circuit constant. The fan motor driving circuit is integrated as one LSI; and accordingly, a circuit area can be reduced.

Another embodiment of the present invention is a cooling device. This device includes a fan motor and the above mentioned fan motor driving circuit which drives the fan motor.

Still another embodiment of the present invention is an electronic computer. The electronic computer includes an arithmetic processing unit and a cooling device which cools at least the arithmetic processing unit.

Further embodiment of the present invention relates to a driving method of a fan motor, which controls an energized state of the fan motor by performing on and off control of a switching circuit connected to a coil of the fan motor. The driving method includes: generating a voltage that changes with time by charging or discharging a capacitor at the start of starting up the fan motor; generating a drive signal on the basis of the generated voltage when at least starting up, and performing on and off control of the switching circuit by the drive signal; and initializing the capacitor by discharging a charge across the capacitor with a transition from off to on of a power supply voltage to be supplied to the fan motor driving circuit as a turning point.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Preferred embodiments relate to a fan motor driving circuit used in an electronic computer such as a desktop type or notebook type personal computers and a workstation, or a cooling device which is for cooling an electronic apparatus such as a refrigerator.

First Preferred Embodiment

Figure 1:
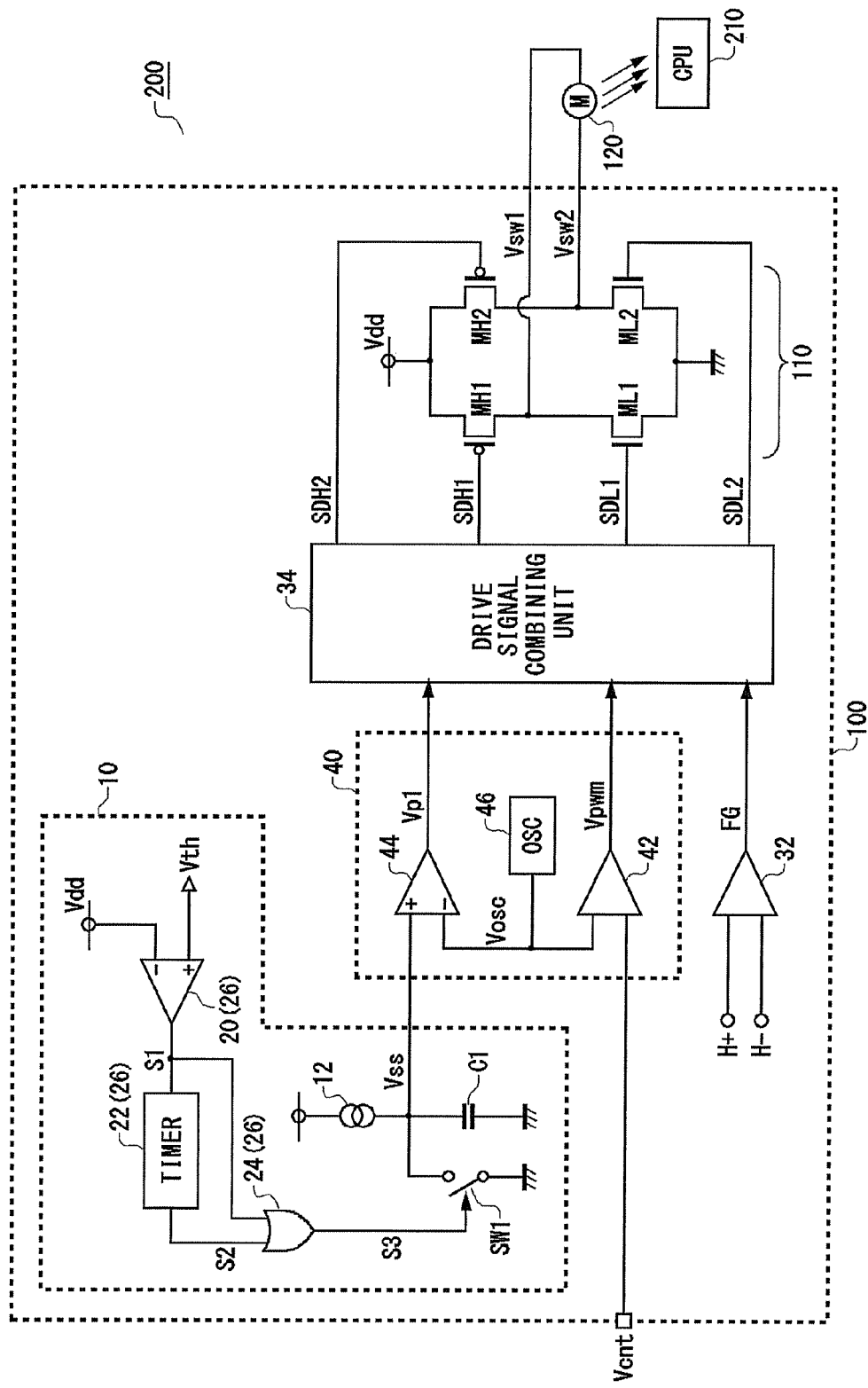
FIG. 1 is a circuit diagram showing a configuration of a cooling device according to a first preferred embodiment.

FIG. 1 is a circuit diagram showing a configuration of a cooling device 200 according to a first preferred embodiment. FIG. 1 shows a configuration of a part of an electronic computer, and the cooling device 200 and a central processing Unit (CPU) 210 of a cooling object are included. The cooling device 200 includes a fan motor driving circuit 100 and a fan motor 120.

The fan motor 120 is a single phase full wave motor and is arranged in opposition to the CPU 210 in the preferred embodiment. In the fan motor 120, a coil current, that is, an energized state is controlled by switching voltages Vsw1 and Vsw2 which are generated by the fan motor driving circuit 100 and rotation is controlled.

A switching circuit 110 includes a first high side transistor MH1, a second high side transistor MH2, a first low side transistor ML1, and a second low side transistor ML2; and accordingly, an H bridge circuit is constituted.

On and off of the transistors MH1 and ML1 are controlled by a high side drive signal SDH1 and a low side drive signal SDL1. Similarly, on and off of the transistors MH2 and ML2 are controlled by drive signals SDH2 and SDL2. The switching voltages Vsw1 and Vsw2 generated by the switching circuit 110 are applied to both ends of the fan motor 120.

In addition, four transistors constituting the switching circuit 110 may be monolithically integrated and incorporated in the fan motor driving circuit 100, or may be provided on the outside of the fan motor driving circuit 100. Furthermore, a reverse blocking diode may be arranged to sources of the first high side transistor MH1 and the second high side transistor MH2 and a power supply (not shown in the drawing) which outputs a power supply voltage Vdd.

The fan motor driving circuit 100 generates the drive signals SDH1, SDH2, SDL1, and SDL2 (hereinafter, given a generic name as drive signals SD if required), and outputs the same to the respective transistors MH1, MH2, ML1, and ML2 of the switching circuit 110. On and off control of the respective transistors MH1, MH2, ML1, and ML2 of the switching circuit 110 are controlled in response to the drive signals SD, and an energization time of the coil of the fan motor 120 is controlled.

A torque of the fan motor 120, that is, a rotation control voltage Vcnt to be set in response to a target value of the number of rotation of the fan is input to the fan motor driving circuit 100 from the outside. The rotation control voltage Vcnt may be generated in the inside of the fan motor driving circuit 100. The fan motor driving circuit 100 generates pulse-modulated drive signals SDH1, SDL1, SDH2, and SDL2 which specify the energization time of the coil of the fan motor 120 of a driving object on the basis of the rotation control voltage Vcnt, and outputs the same to the switching circuit 110 serving as an output stage.

The fan motor driving circuit 100 includes a pulse width modulator 40, a hall comparator 32, a drive signal combining unit 34, and the switching circuit 110. The fan motor driving circuit 100 is formed on one semiconductor substrate as a functional IC.

The hall comparator 32 compares potentials of hall signals H+ and H− output from a hall element (not shown in the drawing), and generates a frequency generation signal (hereinafter, referred to as FG signal) whose high level and low level change in response to a positional relation (phase) between a rotor and a stator of the fan motor 120.

A variable reference voltage circuit 10 generates a voltage Vss which changes a voltage value with time when starting up the fan motor 120. The variable reference voltage circuit 10 charges (or discharges) a capacitor by a current, and is configured as a time constant circuit which outputs a voltage across the capacitor.

The variable reference voltage circuit 10 includes a current source 12, a capacitor C1, an initialization switch SW1, a comparator 20, a timer circuit 22, and an OR gate 24.

One end of the capacitor C1 is grounded, and the other end thereof is connected to the current source 12. The initialization switch SW1 is arranged in parallel with the capacitor C1. The comparator 20, the timer circuit 22, and the OR gate 24 constitute a switch control unit 26 which performs on and off control of the initialization switch SW1.

The switch control unit 26 and the initialization switch SW1 constitute an initialization circuit. The initialization circuit initializes the capacitor C1 before executing soft start with a transition from off to on of the power supply voltage Vdd to be supplied to the fan motor driving circuit 100 as a turning point.

For example, the switch control unit 26 detects the transition from off to on of the power supply voltage Vdd to be supplied to the fan motor driving circuit 100, and the initialization switch SW1 is turned on during a predetermined time $\tau 1$ after the detection. When the initialization switch SW1 is turned on, a charge stored in the capacitor C1 is discharged and the voltage Vss is initialized to near 0 V. The predetermined time $\tau 1$ may be set a value sufficient for discharging the capacitor C1, for example, $\tau 1=1$ ms. In addition, the value may be appropriately set in response to capacitance of the capacitor C1 and on-resistance of the initialization switch SW1.

The comparator 20 compares the power supply voltage Vdd with a predetermined threshold voltage Vth; and the comparator 20 generates a comparison signal S1 which is a low level when the power supply voltage Vdd is higher, and a high level when the power supply voltage Vdd is lower. That is, when the power supply voltage Vdd is transited from off (0 V) to on (predetermined value), the comparison signal S1 is transited from the high level to the low level.

On the contrary, when the power supply voltage Vdd is transited from on to off, the comparison signal S1 is transited from the low level to the high level. In this case, however, when the power supply voltage Vdd is lowered and the comparator 20 does not operate, the comparison signal S1 becomes the low level again.

The timer circuit 22 receives the comparison signal S1 from the comparator 20, and starts time measurement with the transition from the high level to the low level of the comparison signal S1 as a turning point. Then, the timer circuit 22 generates a control signal S2 to be the high level during the predetermined time $\tau 1$.

The OR gate 24 generates logical sum of the control signal S2 and the comparison signal S1, and outputs the same to the initialization switch SW1. The initialization switch SW1 is turned on when a switch control signal S3 serving as an output of the OR gate 24 is at the high level.

The switch control signal S3 becomes the high level during a small period after the power supply voltage Vdd is interrupted and during the predetermined time $\tau 1$ after the power supply voltage Vdd is transited from off to on.

The pulse width modulator 40 receives the voltage Vss and the control voltage Vcnt, and generates a pulse signal Vp1 and a pulse width modulation signal (hereinafter, referred to as PWM signal) Vpwm, each of which having a duty ratio corresponding to each voltage value.

The pulse width modulator 40 includes an oscillator 46, a PWM comparator 42, and a soft start comparator 44.

The oscillator 46 generates a periodic voltage Vosc of a predetermined frequency. The periodic voltage Vosc is a sawtooth wave or triangular wave. The soft start comparator 44 compares the voltage Vss with the periodic voltage Vosc, and generates the pulse signal Vp1 whose duty ratio changes in response to a voltage value of the voltage Vss. The PWM comparator 42 compares the control voltage Vcnt with the periodic voltage Vosc, and generates the PWM signal Vpwm whose duty ratio changes in response to a voltage value of the control voltage Vcnt.

The hall comparator 32 compares the hall signals H+ and H− output from the hall element (not shown in the drawing), and generates the frequency generation signal (hereinafter, referred to as FG signal) whose high level and low level change in response to the phase of the rotor of the fan motor 120.

The drive signal combining unit 34 receives the pulse signal Vp1, the PWM signal Vpwm, and the FG signal. Since the configuration and the operation of the drive signal combining unit 34 are known, description will be made simply.

The drive signal combining unit 34 selects any one of a group of the transistors MH1 and ML2 or a group of the transistors MH2 and ML1 in response to the level of the FG signal, and allows them to be an energized state one after the other. Further, the drive signal combining unit 34 selects a signal of a smaller duty ratio of the pulse signal Vp1 and the PWM signal Vpwm, and turns on and off the transistors MH1 and MH2 of the switching circuit 110 at a higher frequency than the FG signal on the basis of the selected pulse signal.

The voltage Vss is low when immediately after starting up the fan motor driving circuit 100; and therefore, the duty ratio of the pulse signal Vp1 is smaller than that of the PWM signal Vpwm. Therefore, the pulse signal Vp1 is selected immediately after starting up, and on the basis of this signal, an energization time of the switching circuit 110 is controlled.

After that, the duty ratio of the pulse signal Vp1 increases with an increase of the voltage Vss; and when the duty ratio of the pulse signal Vp1 exceeds that of the PWM signal Vpwm, the drive signal combining unit 34 controls the switching circuit 110 on the basis of the PWM signal Vpwm. For example, the drive signal combining unit 34 may control the switching circuit 110 on the basis of logical multiplication of the PWM signal Vpwm and the pulse signal Vp1.

The control of the switching circuit 110 based on the pulse signal Vp1 and the PWM signal Vpwm may be configured as follows: for example, the PWM comparator 42 has three terminal inputs. Three input comparator includes two + terminals and one − terminal (+ and − may be reversed). Then, the voltage Vss and the control voltage Vcnt are input to the two + terminals; and the periodic voltage Vosc is input to the − terminal. The three input comparator outputs a result of comparison between a smaller one of the two voltages input to the two + terminals and the periodic voltage Vosc. The drive signal combining unit 34 may control the switching circuit 110 on the basis of an output of the three input comparator.

That is, in at least starting up, the drive signal combining unit 34 generates the drive signals SD on the basis of the voltage Vss, and may perform on and off control of the switching circuit 110 by the drive signals SD.

Figure 2:
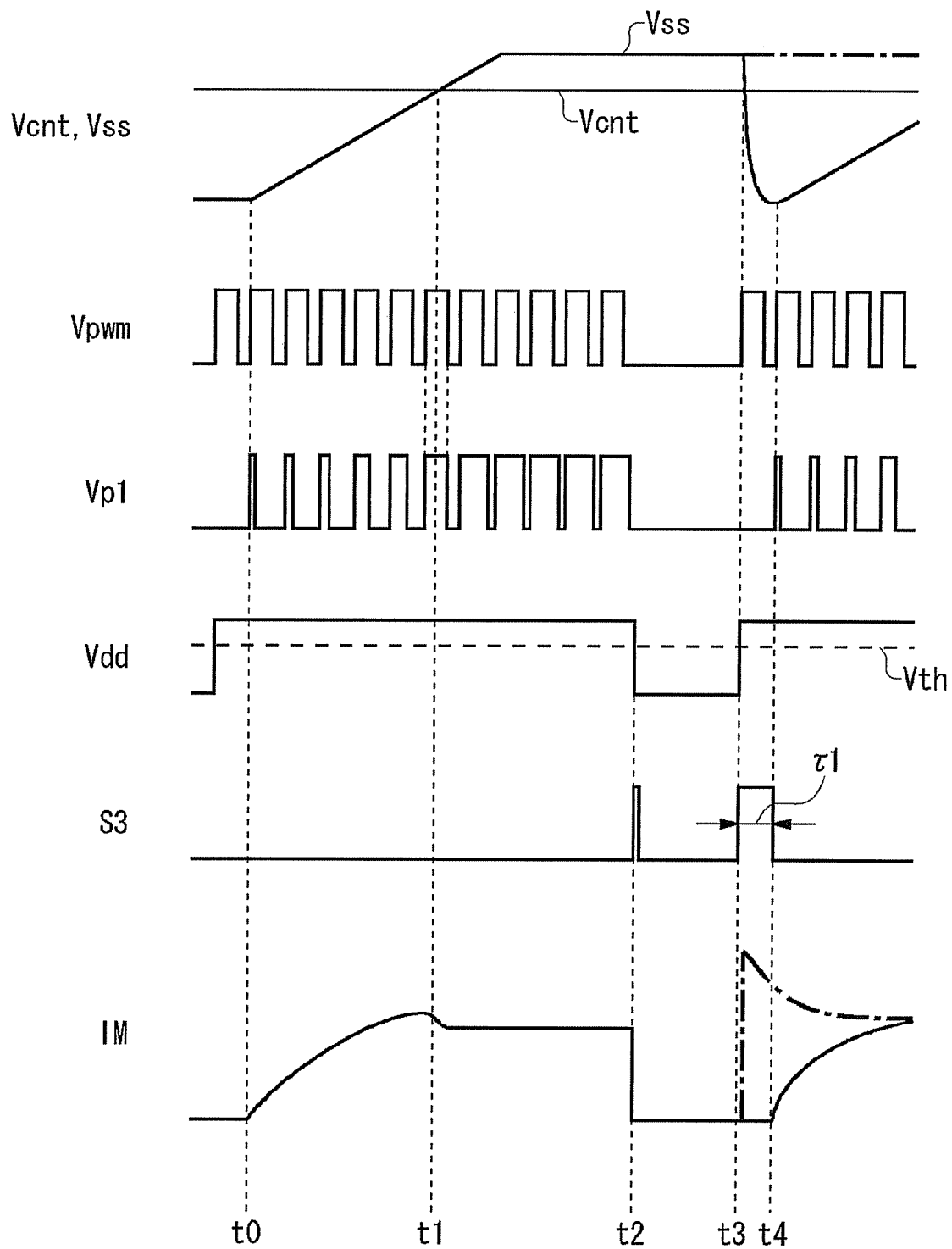
FIG. 2 is a time chart showing an operation of a fan motor driving circuit shown in FIG. 1.

The operation of the thus configured fan motor driving circuit 100 will be described. FIG. 2 is a time chart showing the operation of the fan motor driving circuit 100 shown in FIG. 1. FIG. 2 shows a control voltage Vcnt and a voltage Vss, a PWM signal Vpwm, a pulse signal Vp1, a power supply voltage Vdd, a switch control signal S3, and a coil current IM of the fan motor 120 beginning at the top.

The power supply voltage Vdd is interrupted before a time t0. The power supply voltage Vdd is raised and a starting up process is started at the time t0. As a result, the voltage Vss begins to be increased with time. The drive signal combining unit 34 controls the switching circuit 110 on the basis of the duty ratio of the pulse signal Vp1 during Vss<Vcnt. As a result, the coil current IM is slowly increased. After a time t1, it becomes Vss>Vcnt; and therefore, the drive signal combining unit 34 controls the switching circuit 110 on the basis of the duty ratio of the PWM signal Vpwm. As a result, the coil current IM is maintained constant, and the fan motor 120 is rotated at a desired number of rotation.

The power supply voltage Vdd is suddenly turned off at a time t2. Then, the comparison signal S1 becomes the high level during only a short time; and in response to this, the switch control signal S3 also becomes the high level. However, the time at the high level is short; and therefore, the capacitor C1 is not discharged, and the voltage Vss remains its original value.

The power supply voltage Vdd is turned on again at a time t3. In response to this, the switch control signal S3 (control signal S2) becomes the high level at a predetermined time τ1, the initialization switch SW1 is turned on, the capacitor C1 is discharged, and the voltage Vss is lowered to 0 V.

After that, when the switch control signal S3 (S2) becomes the low level at a time t4, the initialization switch SW1 is turned off, the capacitor C1 is charged by the current source 12, and the starting up process is executed again.

The above is the operation of the fan motor driving circuit 100 shown in FIG. 1. An effect of the fan motor driving circuit 100 becomes clearly by comparing with the operation in the case where a discharge process is not performed at the time t3.

If the discharge process is not performed, the voltage Vss is continued to hold the constant value as shown by a dashed-dotted line in FIG. 2. When the power supply voltage Vdd is turned on at the time t3 in this state, the switching circuit 110 is controlled on the basis of the duty ratio of the PWM signal Vpwm; and therefore, the coil current IM is suddenly increased as shown by the dashed-dotted line and becomes an overcurrent. It is not preferable because the overcurrent exerts an influence on reliability of circuit element and causes a secondary problem such as heating.

On the contrary, according to the fan motor driving circuit 100 according to the present preferred embodiment, at a timing when the power supply voltage Vdd is turned on, the voltage Vss can be surely increased from 0 V by initializing (discharging) the capacitor C1, and the coil current IM can be slowly increased.

Second Preferred Embodiment

Figure 3:
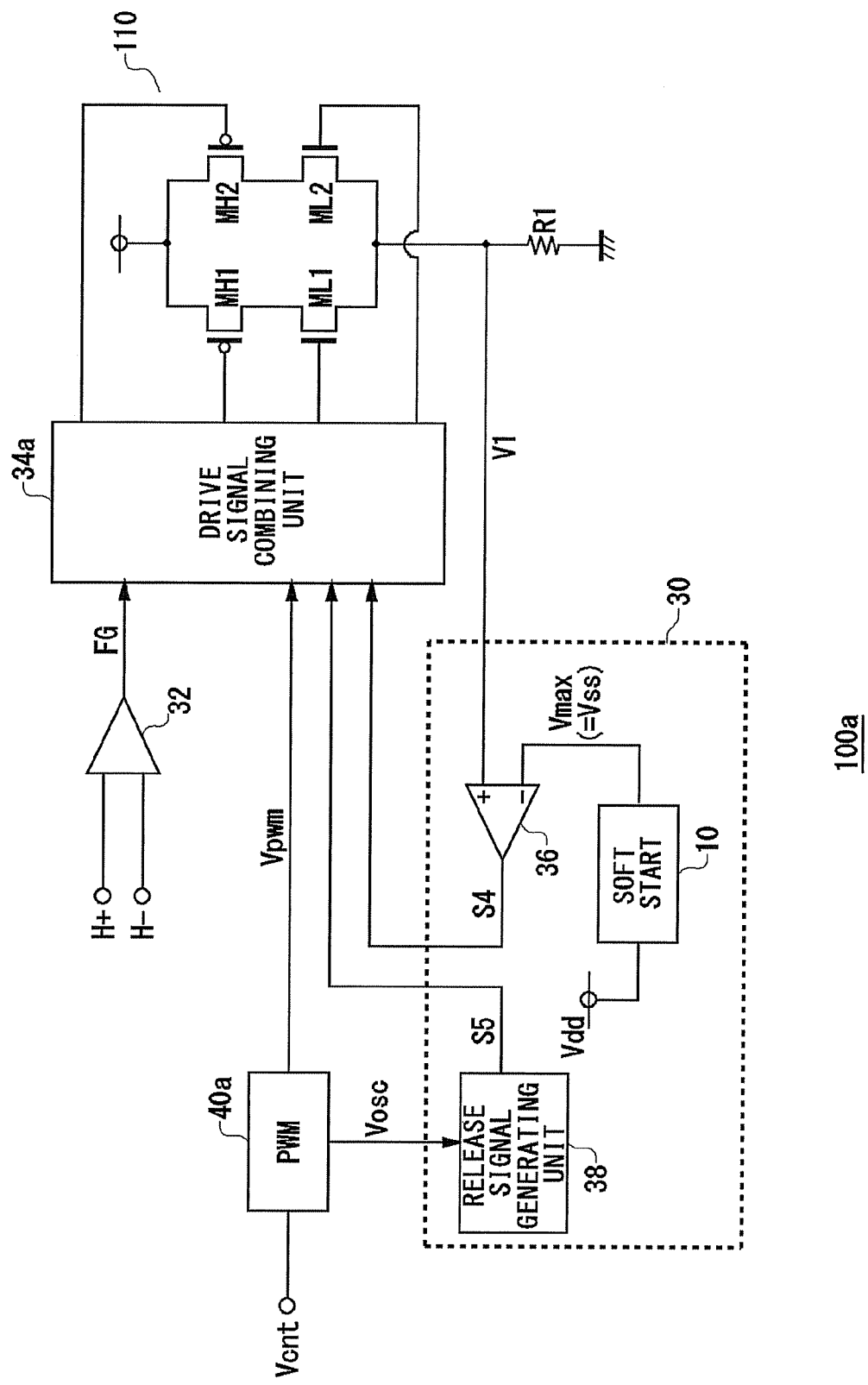
FIG. 3 is a circuit diagram showing a configuration of the fan motor driving circuit according to a second preferred embodiment.

FIG. 3 is a circuit diagram showing a configuration of a fan motor driving circuit 100a according to a second preferred embodiment. Only different points from the fan motor driving circuit 100 shown in FIG. 1 will be described below.

The fan motor driving circuit 100 shown in FIG. 1 is started up by slowly increasing the duty ratio of the pulse signal which is for controlling the switching circuit 110. On the contrary, the fan motor driving circuit 100a shown in FIG. 3 detects a coil current IM flowing into a fan motor 120, and controls an energization time of the fan motor 120 so that the coil current IM does not exceed an upper limit current Imax. In starting up, the fan motor driving circuit 100a slowly increases the upper limit current Imax. As a result, the fan motor can be suitably started up.

The fan motor driving circuit 100a shown in FIG. 3 includes a hall comparator 32, a pulse width modulator 40a, a current limit circuit 30, a drive signal combining unit 34a, a switching circuit 110, and a detection resistor R1.

The pulse width modulator 40a is configured including the PWM comparator 42 and the oscillator 46 shown in FIG. 1, and generates the PWM signal Vpwm.

The detection resistor R1 detects the motor coil current IM, further converts into a voltage, and functions as a current detection circuit which outputs as a detection voltage V1. The current limit circuit 30 controls the drive signal combining unit 34a so that the detection voltage V1 does not exceed an upper limit voltage Vmax which sets the upper limit value Imax of the coil current IM. In the present preferred embodiment, the upper limit voltage Vmax is a voltage Vss, and a voltage which increases with start up and, after that, holds a constant value.

A comparator 36 compares the detection voltage V1 with the voltage Vss (upper limit voltage Vmax). When the voltages are V1>Vss, the comparator 36 fixes a logical values of drive signals SD generated by the drive signal combining unit 34a so as to stop the current to be supplied to the motor by the switching circuit 110. After that, fixation of the logical value is released after a lapse of a significant period, and restarts energization to the motor. The comparator 36 outputs a result of the voltage comparison to the drive signal combining unit 34a as a control signal S4. The drive signal combining unit 34a stops the energization to the motor and restarts on the basis of the control signal S4. For example, the drive signal combining unit 34a includes an AND gate and on OR gate, and reflects the logical value of the control signal S4 to the drive signals SD.

Further, the current limit circuit 30 includes a release signal generating unit 38. The release signal generating unit 38 generates a release signal S5 which releases the fixation of the logical value of the drive signals SD at a predetermined timing. The predetermined timing is preferable to be in synchronization with the drive signals SD. In order to synchronize the release signal S5 with the drive signals SD, the release signal generating unit 38 receives a periodic voltage Vosc from the pulse width modulator 40a.

The drive signal combining unit 34a restarts the energization to the motor when the release of the logical value fixation of the drive signals SD is directed by the release signal S5. Other configuration and the operation are the same as those of FIG. 1.

According to the fan motor driving circuit 100a shown in FIG. 3, the upper limit value of the coil current IM is increased with the increase of the voltage Vss. Therefore, since the coil current IM increases along with the upper limit value Imax of the current corresponding to the voltage Vss, the fan motor 120 can be suitably started up.

In also the fan motor driving circuit 100a shown in FIG. 3, the variable reference voltage circuit 10 having the initialization switch SW1, which is similar to that shown in FIG. 1, is provided; and accordingly, the voltage Vss can be reset in response to on and off of the power supply voltage, and the fan motor 120 can be suitably started up.

It is to be understood to those skilled in the art that the configurations of the above preferred embodiments are made by way of examples, various modifications are possible in the combination of their respective constituent elements and respective treatment processes, and such modifications fall within the scope of the present invention.

In the preferred embodiments, as pulse modulation, pulse width modulation which controls a pulse width is described as an example; however, the present invention can also be applied to a fan motor driving circuit which performs other pulse modulation such as pulse frequency modulation (PFM).

In the preferred embodiments, the case where the single phase motor is driven is described; however, the present invention is not limited to this. That is, it is possible to be applied in a fan motor driving circuit which drives a three phase motor or the like.

In the preferred embodiments, the case where the fan motor driving circuit 100 drives the fan motor is described; however, the motor to be a driving object of the fan motor driving circuit according to the present invention is not limited to the fan motor; but, it is possible to be widely applied in other single phase and multi phase motors.

In the circuits described in the preferred embodiments, the logical value of the high level or the low level of the signal is an example, and it is possible to freely change by appropriately inverting by an inverter or the like. Furthermore, in response to this, replacement of the AND gate or replacement of the OR gate will be readily conceived to those skilled in the art.

In the preferred embodiments, the transition of on and off of the power supply voltage Vdd is detected by using the comparator 20; however, the present invention is not limited to this. For example, a state of a switch which switches on and off of the power supply voltage Vdd may be observed.

While the preferred embodiments of the present invention have been described using specific terms, such description is for illustrative purposes only, and it is to be understood that changes and variations may be made without departing from the spirit or scope of the appended claims.

What is claimed is:

1. A fan motor driving circuit which controls an energized state of a fan motor by performing on and off control of a switching circuit connected to a coil of the fan motor, the fan motor driving circuit comprising:
    a variable reference voltage circuit which generates a voltage whose voltage level changes with time by charging or discharging a capacitor at the start of starting up the fan motor;
    a drive signal combining unit which generates a drive signal on the basis of a voltage output from the variable reference voltage circuit when at least starting up, and performs on and off control of the switching circuit by the drive signal; and
    an initialization circuit which initializes the capacitor by discharging a charge across the capacitor with a transition from off to on of a power supply voltage to be supplied to the fan motor driving circuit as a turning point.

2. The fan motor driving circuit according to claim 1, wherein
    the initialization circuit includes:
    an initialization switch arranged between one end of the capacitor and a fixed potential terminal; and
    a switch control unit which detects the transition from on to off of the power supply voltage, and turns on the initialization switch during a predetermined time after detection.

3. The fan motor driving circuit according to claim 2, wherein
    the switch control unit includes:
    a comparator which compares the power supply voltage with a predetermined threshold voltage, and generates a comparison signal that becomes a first level when the power supply voltage is higher or a second level when the power supply voltage is lower, than the predetermined threshold voltage; and
    a timer circuit which receives the comparison signal from the comparator, starts time measurement with a transition from the first level to the second level of the comparison signal as a turning point, and generates a control signal that becomes a predetermined level during a predetermined time, and wherein the initialization switch is switched on and off in response to the control signal.

4. The fan motor driving circuit according to claim 2, wherein
the switch control unit further detects the transition from on to off of the power supply voltage, and turns on the initialization switch with the detection as a turning point.

5. The fan motor driving circuit according to claim 1, further comprising:
an oscillator which generates a periodic voltage of a predetermined frequency; and
a comparator which compares the voltage output from the variable reference voltage circuit with the periodic voltage, and generates a pulse signal whose duty ratio changes in response to a voltage value of the voltage output from the variable reference voltage circuit, and wherein
the drive signal combining unit controls an energization time of the switching circuit on the basis of the pulse signal.

6. The fan motor driving circuit according to claim 1, further comprising:
a current detection circuit which detects a current flowing through the coil of the fan motor, converts into a voltage, and outputs the same as a detection voltage; and
a current limit circuit which controls the drive signal combining unit so that the detection voltage does not exceed an upper limit voltage which sets an upper limit of the current flowing through the coil, and wherein
the voltage output from the variable reference voltage circuit is set to the upper limit voltage.

7. The fan motor driving circuit according to claim 6, wherein
the current limit circuit includes a comparator which compares the detection voltage with the upper limit voltage, and the current limit circuit fixes a logical value of the drive signal generated by the drive signal combining unit so that a current supply to the fan motor by the switching circuit is stopped when the detection voltage exceeds the upper limit voltage, and then, releases the fixation of the logical value at a predetermined timing.

8. The fan motor driving circuit according to claim 7, wherein
the current limit circuit further includes a release signal generating unit which generates a release signal that is in synchronization with the drive signal generated in the drive signal combining unit and becomes a predetermined level, and releases the fixation of the logical value of the drive signal with the release signal generated by the release signal generating unit becoming the predetermined level as a turning point.

9. The fan motor driving circuit according to claim 1, wherein
the fan motor driving circuit is monolithically integrated on one semiconductor substrate.

10. A cooling device, comprising:
a fan motor; and
a fan motor driving circuit as set forth in claim 1, which drives the fan motor.

11. An electronic computer, comprising:
an arithmetic processing unit; and
a cooling device as set forth in claim 10, which cools at least the arithmetic processing unit.

12. A driving method of a fan motor, which controls an energized state of the fan motor by performing on and off control of a switching circuit connected to a coil of the fan motor of a driving object, the driving method comprising:
generating a voltage that changes with time by charging or discharging a capacitor at the start of starting up the fan motor;
generating a drive signal on the basis of the generated voltage when at least starting up, and performing on and off control of the switching circuit by the drive signal; and
initializing the capacitor by discharging a charge across the capacitor with a transition from off to on of a power supply voltage to be supplied to the fan motor driving circuit as a turning point.

* * * * *